(12) United States Patent
Scully et al.

(10) Patent No.: US 10,536,814 B1
(45) Date of Patent: Jan. 14, 2020

(54) METHOD FOR DETERMINING PRESENCE OF A MOBILE COMPUTING DEVICE IN A VEHICLE

(71) Applicant: Passport Labs, Inc., Charlotte, NC (US)

(72) Inventors: Michael N. B. Scully, Charlotte, NC (US); Raymond Robinson, Charlotte, NC (US)

(73) Assignee: PASSPORT LABS, INC., Charlotte, NC (US)

( * ) Notice: Subject to any disclaimer, the term of this patent is extended or adjusted under 35 U.S.C. 154(b) by 0 days.

(21) Appl. No.: 16/451,722

(22) Filed: Jun. 25, 2019

Related U.S. Application Data

(60) Provisional application No. 62/689,888, filed on Jun. 26, 2018.

(51) Int. Cl.
*H04M 3/42* (2006.01)
*H04W 4/029* (2018.01)
*H04W 4/40* (2018.01)
*H04W 4/02* (2018.01)
*H04M 1/725* (2006.01)
*G07C 5/00* (2006.01)

(52) U.S. Cl.
CPC ............ *H04W 4/029* (2018.02); *G07C 5/008* (2013.01); *H04M 1/72569* (2013.01); *H04M 1/72572* (2013.01); *H04W 4/027* (2013.01); *H04W 4/40* (2018.02)

(58) Field of Classification Search
CPC ....... H04W 4/029; H04W 4/40; H04W 4/027; H04W 4/80; H04W 4/022; H04W 12/02; H04W 12/08; H04W 4/44; H04M 1/72569; H04M 1/72572; G07C 5/008; G07C 9/00111; G10L 17/005; H04L 65/1069; H04L 29/06; H04L 29/08; H04L 63/0428; H04L 67/12; H04L 67/303; H04L 63/102; G06F 21/32; G06F 21/6245; B60R 25/31; B60R 16/037; G01D 11/00; B60N 2/002
USPC ........................................ 455/414.1; 702/150
See application file for complete search history.

(56) References Cited

U.S. PATENT DOCUMENTS 8,326,259 B2 * 12/2012 Gautama ................ G08C 17/02
455/404.1
9,900,315 B2 * 2/2018 Yusuf .................... H04W 12/02
(Continued)

FOREIGN PATENT DOCUMENTS

EP 0573320 B1 7/1997
EP 3104584 A1 * 12/2016 ......... H04L 67/1095
(Continued)

*Primary Examiner* — Mahendra R Patel
(74) *Attorney, Agent, or Firm* — Trego, Hines & Ladenheim, PLLC

(57) ABSTRACT

A method of determining the presence of a mobile computing device in a vehicle includes: moving the mobile computing device into a vehicle; establishing a data communications connection to the mobile computing device over a data network; collecting at least one identifying factor through the data communications connection which at least partially identifies the vehicle; using an electronic processor, executing at least one software rule to make a vehicle determination which identifies the vehicle based on the at least one identifying factor; and storing the result of the vehicle determination for further use.

18 Claims, 4 Drawing Sheets

(56) References Cited

U.S. PATENT DOCUMENTS

| | | | |
|---|---|---|---|
| 9,984,522 B2* | 5/2018 | Ricci | H04L 9/321 |
| 10,189,425 B2* | 1/2019 | Bell | B60R 16/023 |
| 2003/0069784 A1* | 4/2003 | Banerjee | G06Q 30/04 |
| | | | 705/13 |
| 2008/0214161 A1* | 9/2008 | Jakl | H04M 1/72572 |
| | | | 455/414.2 |
| 2013/0278415 A1* | 10/2013 | Morgan, Jr. | G08B 21/22 |
| | | | 340/539.13 |
| 2014/0053260 A1* | 2/2014 | Gupta | G06F 21/50 |
| | | | 726/22 |
| 2014/0077972 A1* | 3/2014 | Rathi | G07C 5/008 |
| | | | 340/902 |
| 2014/0179356 A1* | 6/2014 | Hannon | B60K 35/00 |
| | | | 455/456.4 |
| 2014/0244365 A1* | 8/2014 | Price | G07B 15/00 |
| | | | 705/13 |
| 2014/0297220 A1* | 10/2014 | Raffa | B60N 2/002 |
| | | | 702/150 |
| 2015/0149042 A1* | 5/2015 | Cooper | B60R 16/037 |
| | | | 701/48 |
| 2015/0262067 A1* | 9/2015 | Sridhara | G06N 5/04 |
| | | | 706/12 |
| 2017/0142552 A1* | 5/2017 | Salter | G07C 5/008 |
| 2018/0059669 A1* | 3/2018 | Madigan | G08G 1/00 |
| 2018/0137263 A1* | 5/2018 | Kurian | G06F 21/84 |
| 2018/0137264 A1* | 5/2018 | Kurian | G06F 21/32 |
| 2018/0204396 A1* | 7/2018 | Cox | G07C 5/02 |
| 2019/0111864 A1 | 4/2019 | Bell | |

FOREIGN PATENT DOCUMENTS

| | | | | |
|---|---|---|---|---|
| EP | 3355250 A1 * | 8/2018 | | B60R 21/00 |
| ES | 2696425 A1 | 1/2019 | | |
| WO | 2016055226 A1 | 4/2016 | | |

* cited by examiner

METHOD FOR DETERMINING PRESENCE OF A MOBILE COMPUTING DEVICE IN A VEHICLE

BACKGROUND OF THE INVENTION

This invention relates generally to portable electronic devices, and more particularly to a method for determining the location of a portable electronic device is within a specific vehicle.

It is known to use a software application running on a mobile computing device to track a user's location and ultimately to report that location to a remote computer system. The remote computer system may use the location information for purposes such as calculation and payment of fees, for example road tolls or parking fees.

The mobile computing device may be moved between different vehicles. In some applications, such as road tolling systems, it is necessary or desirable for the software application to accurately identify which vehicle the mobile computing device is in. For example, the price of a toll may depend on the particular vehicle's characteristics.

One problem with existing software applications of this type is that the user is required to manually interact with the software application in order to set the vehicle identification.

BRIEF SUMMARY OF THE INVENTION

This problem is addressed by an automated method of determining the presence of a mobile computing device with a specific vehicle.

According to one aspect of the technology described herein, a method of determining the presence of a mobile computing device in a vehicle includes: moving the mobile computing device into a vehicle; establishing a data communications connection to the mobile computing device over a data network; collecting at least one identifying factor through the data communications connection which at least partially identifies the vehicle; using an electronic processor, executing at least one software rule to make a vehicle determination which identifies the vehicle based on the at least one identifying factor; and storing the result of the vehicle determination for further use.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
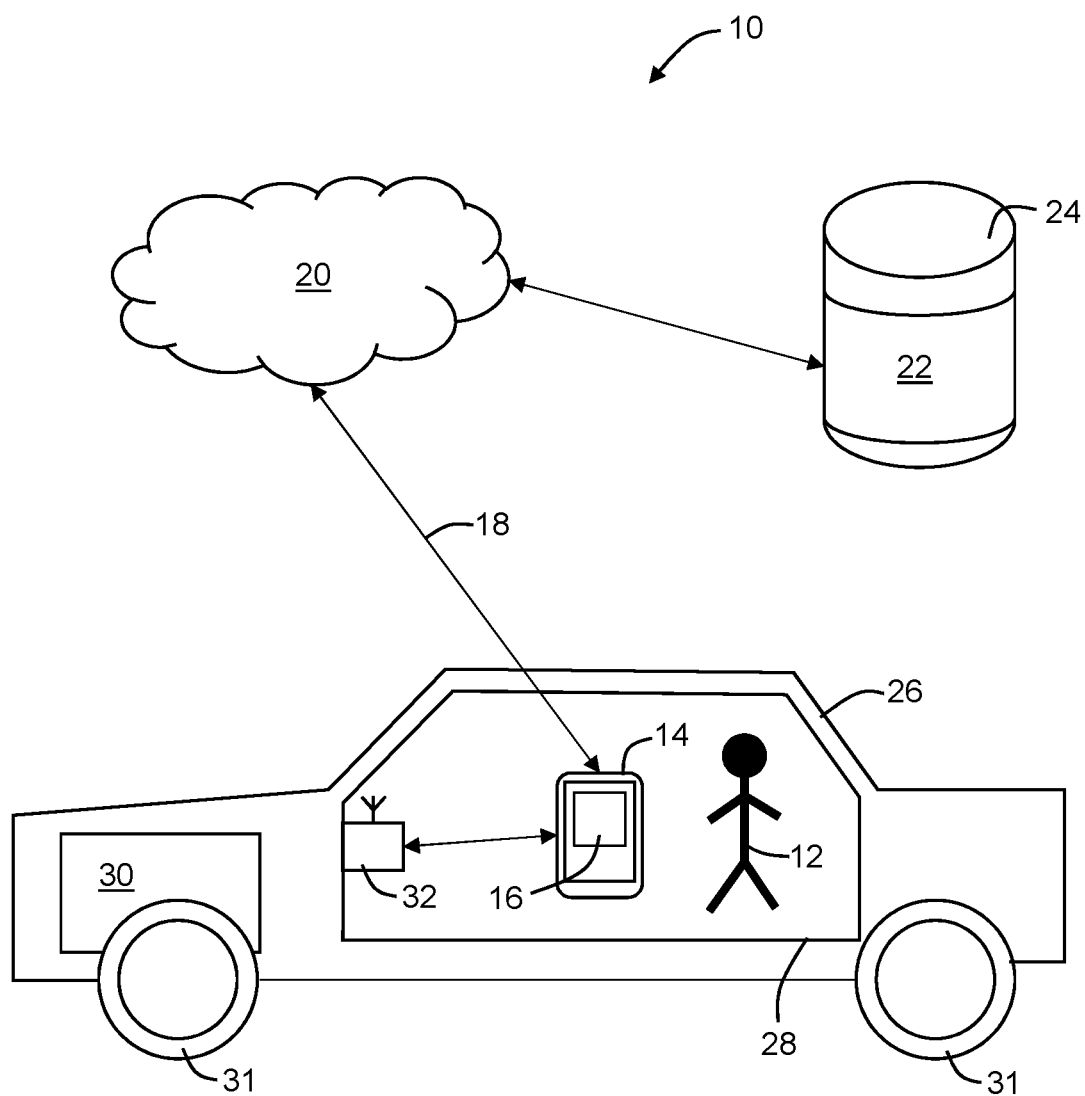
FIG. 1 is a schematic diagram of an exemplary system for determining mobile computing device presence in a specific vehicle.

Referring to the drawings wherein identical reference numerals denote the same elements throughout the various views, FIG. 1 illustrates an exemplary location system 10 for use by one or more users 12.

The method of the present invention is implemented using a conventional mobile computing device 14. The mobile computing device 14 includes one or more microprocessors operable to execute programmed instructions and supporting components such as an electrical power source (e.g. battery), input/output devices (e.g. keyboard, touchscreen display, microphone, and/or speakers), and one or more transceivers operable to communicate data over various wireless protocols such as BLUETOOTH, Wi-Fi, and/or cellular networks. The mobile computing device 14 may include one or more physical data ports for two-way data transmission, for example a port compatible with a universal serial bus (USB) cable. Nonlimiting examples of commercially-available mobile computing devices include laptop computers, tablet computers, "smart watches", and "smartphones".

The mobile computing device 14 may implement at least one location service, defined as a combination of hardware and software operable to determine the geographic location of the mobile computing device 14. Nonlimiting examples of location services include inertial navigation systems, satellite-based navigation (e.g. GPS, GLONASS), WiFi-based location, and cellular-based location.

In the illustrated example, the mobile computing device 14 is a conventional smartphone. The mobile computing device 14 is provisioned with a client software program (also referred to as a "client application" or "client app" 16) containing appropriate programming for carrying out the method described herein.

The mobile computing device 14 may be connected by a communications channel 18 such as a Wi-Fi or a cellular data connection to a wide area network 20 such as the Internet. The mobile computing device 14 may be connected to the wide area network 20 directly, or through an intermediate connection (e.g. a LAN).

The system 10 may include a backend application 22 which communicates with the client app 16 through the wide area network 20. It will be understood that the backend application 22 may be hosted on one or more servers or individual user devices, which are connected to the wide area network 20. A single server 24 hosting the backend application 22 is depicted schematically in block diagram format.

The steps of the vehicle determination method may be carried out on one or more processors. It will be understood that the method may be carried out entirely using processors contained within the mobile computing device 14, or entirely using processors contained external to the mobile computing device (e.g. in another electronic device or in the server 24), or by some combination of the two.

The mobile computing device 14 is used in conjunction with a vehicle 26, shown schematically in FIG. 1.

The vehicle 26 includes a passenger compartment 28 and a drivetrain of a known type, such as the illustrated prime mover 30 which is coupled to wheels 31 through a transmission (not shown).

In operation, the passenger compartment 28 would typically be occupied by the user 12 along with a mobile computing device 14.

Optionally, the vehicle 26 may contain at least one electronic device, shown generally at 32. The electronic device 32 has at least one characteristic that can be accessed through electronic data communications and which at least partially identifies the device. The electronic data communications may take place in a "connected" or "connectionless" mode and may be two-way or one-way communication.

The electronic device 32 may be partially or uniquely-identifiable. Partial identification may be helpful in that it reduces the total population of vehicles from which the vehicle 26 must be identified. Alternatively, the electronic device 32 may be uniquely-identifiable. As used herein the term "uniquely-identifiable electronic device" is defined as an electronic device having at least one characteristic, or one combination of characteristics, that can be accessed through a data communications connection and which uniquely identifies the device.

Examples of electronic devices which may be partially-identifiable include:

A vehicle information and entertainment ("infotainment") system which identifies the manufacturer and/or car model, but does not provide a serial number or other unique ID; or A vehicle infotainment system or a portable electronic vehicle accessory broadcasting a Wi-Fi network service set identifier (SSID); or A vehicle wired or wireless charging interface which identifies the manufacturer and/or car model, but does not provide a serial number or other unique ID.

Examples of electronic devices which may be uniquely-identifiable include:

An electronic device broadcasting a BLUETOOTH network with a media access control ("MAC") address;

A vehicle infotainment system broadcasting a Wi-Fi network SSID (if unique) and/or a MAC address;

A vehicle infotainment system having an accessible serial number or other unique identification number;

A portable electronic accessory having an accessible serial number or other unique identification number;

A portable electronic accessory broadcasting a BLUETOOTH network with a unique MAC address; or A portable electronic vehicle accessory broadcasting a Wi-Fi network SSID (if unique) and/or a MAC address.

Nonlimiting examples of portable electronic vehicle accessories include portable wireless (e.g., BLUETOOTH) speakers, portable information/entertainment systems, or portable Wi-Fi network access points ("hotspots").

The backend application 22 and/or the client app 16 are programmed with one or more rules or algorithms that function to make a real-time determination or conclusion that the mobile computing device 14 is in a specific vehicle. This determination or conclusion may be referred to as a "vehicle determination".

In making the vehicle determination, the system 10 collects and refers to pieces of information or facts referred to herein as "identifying factors", each of which identifies a specific vehicle to some degree. The vehicle determination may be based on one or multiple identifying factors. Generally speaking, the greater the number of identifying factors that imply a specific vehicle, the greater the confidence in the vehicle determination.

In one example, the system 10 may make the vehicle determination by identifying a simple one-to-one correspondence of a single identifying factor (i.e. a unique identifier) with a specific vehicle 26.

In another example, the system 10, that is, any processor or combination of processors in the system 10, may make the vehicle determination by using multiple identifying factors, each of which identifies a specific vehicle 26 to some degree.

The system 10 may incorporate machine learning strategies and/or statistical methods and/or empirical methods to improve the vehicle determination using multiple identifying factors. For example, the system 10 may identify a combination of multiple identifying factors, none of which is unique to a specific vehicle 26, but which in combination identify a specific vehicle 26.

Examples of potential identifying factors which may be used to make the vehicle determination are listed below.

If the vehicle 26 includes a uniquely-identifiable electronic device 32 as described above, the unique identifier obtained from the electronic device 32 may be used by the client app 16 as an identifying factor.

When the mobile computing device 14 is placed in the vehicle 26, a data connection may be established between the electronic device 32 and the mobile computing device 14. For example, the mobile computing device 14 may establish a BLUETOOTH network connection to the vehicle infotainment system. The unique identifier (e.g. serial number, MAC address, SSID if unique, etc.) would be transmitted from the electronic device 32 to the mobile computing device 14 over the data connection. The unique identifier may then be compared to a list of vehicles and associated electronic device unique IDs, for example a table or other data storage structure, stored in the client app 16 or in the backend application 22.

If the vehicle 26 includes a partially-identifiable electronic device 32 as described above, the limited identification such as manufacturer and/or car model may serve as an identifying factor used in the vehicle determination.

The type of data connectivity used may serve as an identifying factor used in the vehicle determination. For example, a specific vehicle 26 may be known to include a specific combination of wireless data connections. Alternatively, the type of data connection may be used as an identifying factor without actually making a network connection. For example, the electronic device 32 may be broadcasting an SSID or a BLUETOOTH device identification name which may be read by the mobile computing device 14.

The type of electronic device 32 may serve as an identifying factor. For example, the electronic device may be built-in to the vehicle 26 or may be portable, and the vehicle 26 may be known to include a specific type of electronic device 32.

Location service information from the mobile computing device 14 may be used as an identifying factor, based on user travel history. For example, if the location service detects that the vehicle 26 is traveling over a frequently used route for the specific user 12, this may serve as an inference that the user 12 is traveling in a frequently-used vehicle 26.

Maps or records of wireless signal changes or patterns may be used as an identifying factor, based on user history. For example, if the location service detects that the vehicle 26 is leaving a Wi-Fi network having a first known SSID and passes through other known networks, this may serve as an inference of the user 12 is traveling in a frequently-used vehicle 26.

The state of the battery of the mobile computing device 14 and/or its charging mode may be used as an identifying factor. For example, the mobile computing device 14 may be connected to a wireless charging pad which is known to be contained in the specific vehicle 26.

Physical data such as accelerometer or inclinometer output, or acoustic information, from the mobile computing device 14 may be used as an identifying factor, based on vehicle characteristics. For example, measured data of acceleration versus time, or velocity versus time, or acoustic emissions versus time, may be associated with a known profile of acceleration versus time or velocity versus time for a specific vehicle 26 or a type of vehicle 26.

An example of the operation of the system 10 is described as follows. Initially, the client app 16 is installed on the user's mobile computing device 14. The user 12 may register a user account or otherwise establish connectivity with the backend server 24.

The client app 16 is used by having the client app 16 active (e.g., running in the foreground or background) while the mobile computing device 14 is within the passenger compartment 28 of the vehicle 26.

Figure 2:
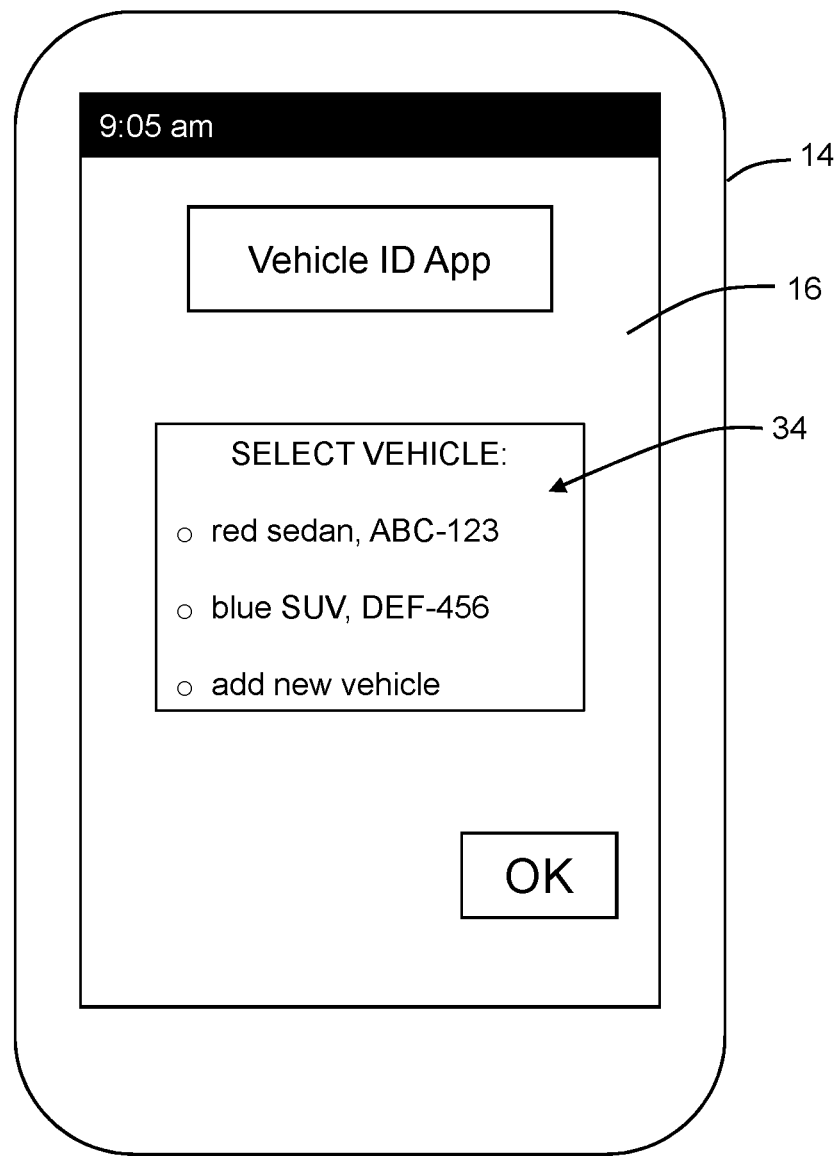
FIG. 2 is a schematic view of mobile computing device displaying a menu prompting a user to select a vehicle from a list of vehicles.
Figure 3:
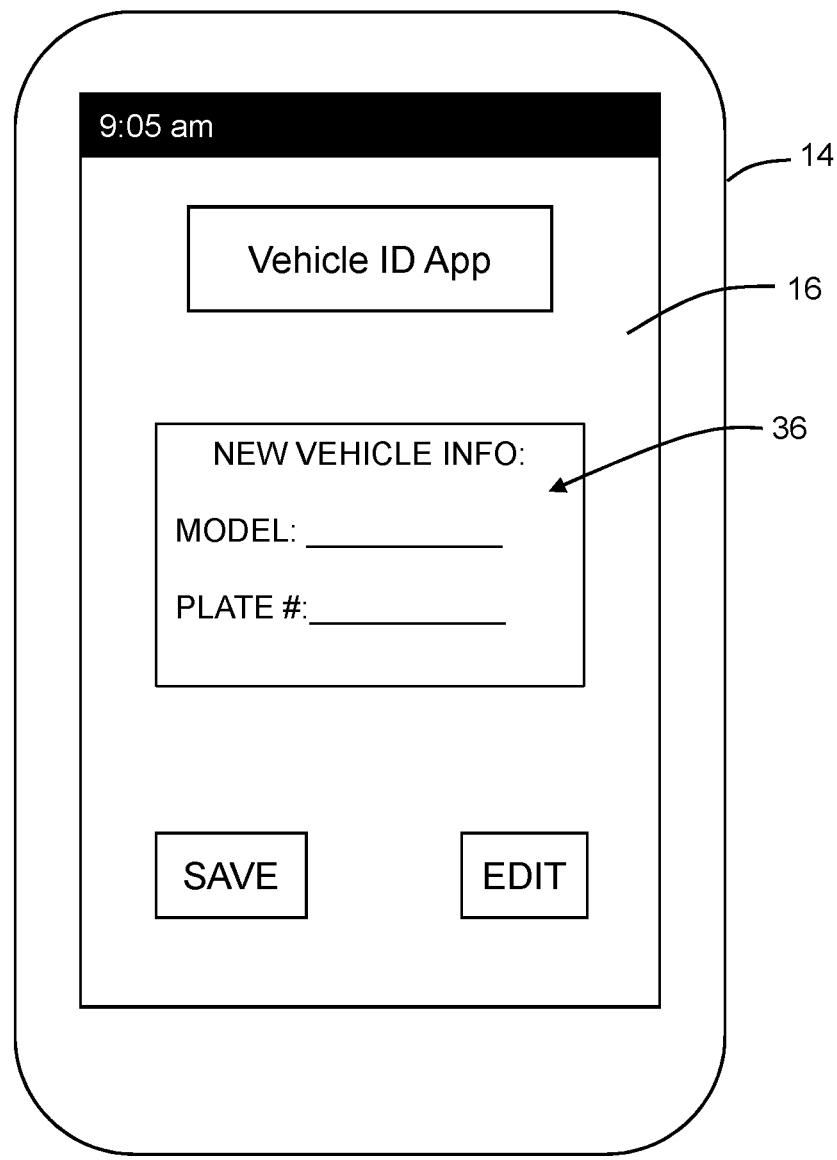
FIG. 3 is a schematic view of a mobile computing device displaying a menu prompting a user to enter identifying information about a new vehicle.

Optionally, the user may interact with the client app 16 to manually identify the vehicle 26, for example by responding to a prompt generated by the client app 16 upon opening, or by actively selecting a control or menu within the client app 16. FIG. 2 illustrates an example of a menu 34 prompting a user to select a vehicle from a predefined list, while FIG. 3 illustrates an example of a menu 36 prompting a user to enter identifying information to establish a new vehicle choice.

The mobile computing device 14 receives and/or collects identifying factors as described above. This information may be transferred upon a discrete event (e.g. initial connection to a data network within the vehicle 26), or it may be collected continuously. (E.g. location information, wireless signal changes, acceleration, etc.)

The system 10 executes the rules and/or algorithms to make a vehicle determination based on the identifying factors described above. The determination may be made at any time during system operation 10. The determination may have a variable level of confidence in the accuracy of the vehicle identification. In other words, it need not be 100% certain in order to be useful. The vehicle determination is then stored electronically, for example in an electronic file in volatile or non-volatile memory, and is then available for subsequent use by the client app 16.

For example, the vehicle determination may be used automatically for transactions related to road tolls, parking or facility access fees, etc. As discussed above, these types of transactions may involve differing rates based on the category or specific identity of a vehicle. The client app 16 can properly calculate tolls, changing vehicles when the mobile computing device 14 moves between vehicles, without needing the user 12 to intervene. As part of the subsequent use, the vehicle determination may be transmitted or relayed directly or indirectly to a computer system remote from the vehicle, for example the backend application 22.

Figure 4:
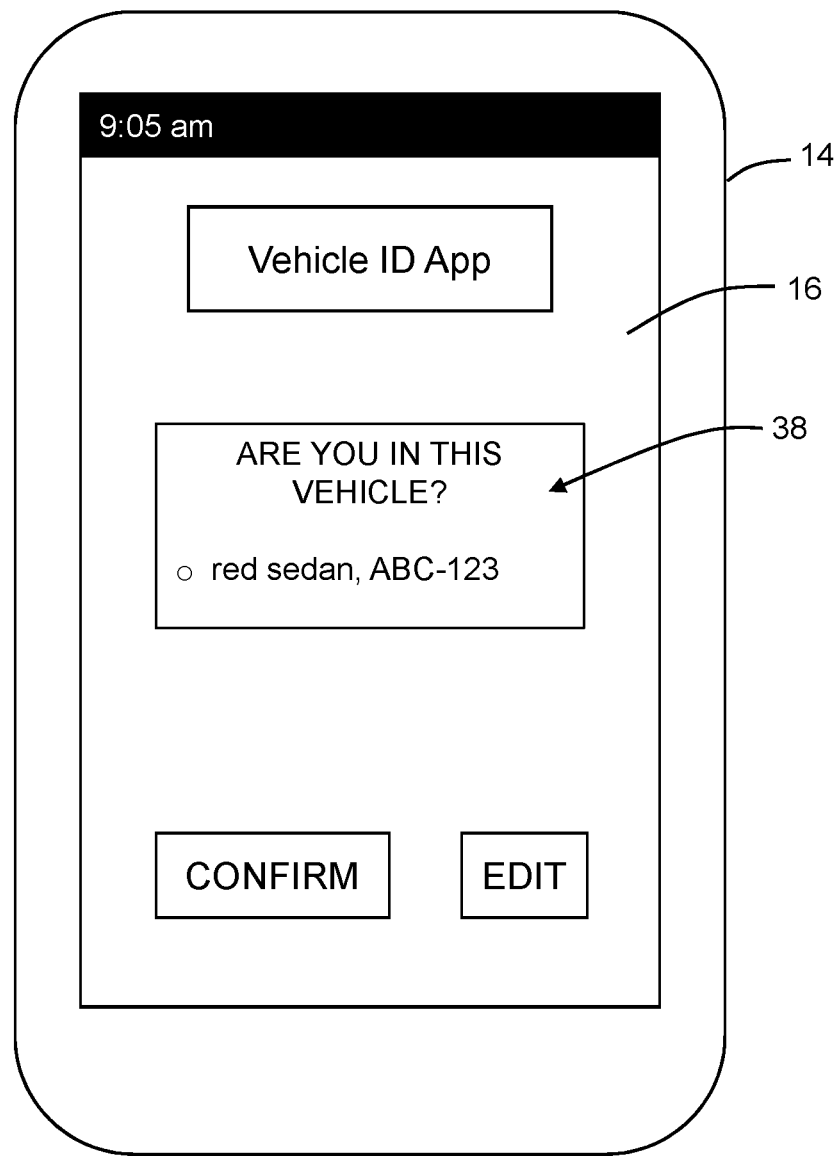
FIG. 4 is a schematic view of a mobile computing device displaying a menu prompting the user to confirm a system-generated vehicle identification.

Optionally, the user 12 may interact with the client app 16 to confirm the vehicle identification, for example by responding to a prompt generated by the client app 16. FIG. 4 illustrates an example of a menu 38 prompting a user 12 to confirm the identification of the vehicle 26 which has been determined by the client app 16.

It is noted that the sequence of events is not critical in making the vehicle determination. For example, the system 10 may initially accept a manual vehicle determination from a user 12 before a trip is started, or before an access event such as parking access occurs, and then collect one or multiple identifying factors as described above during a trip or during an access event. The collected identifying factors would then be flagged as belonging to the identified vehicle 26. This set of verified identifying factors may be considered a "vehicle profile".

On a subsequent trip, the system 10 may automatically make a vehicle determination by comparing collected identifying factors to stored vehicle profiles and selecting the appropriate vehicle profile most closely matching the collected identifying factors.

Alternatively, the system 10 may be used for a trip without an initial manual vehicle determination. The system 10 would collect identifying factors as described above during the trip. The collected identifying factors may then be flagged as belonging to a vehicle 26 based on a probabilistic or statistical determination. This determination may subsequently be used without user intervention or may be presented to the user 12 for manual confirmation.

The foregoing has described a system and method for determining the presence of a mobile computing device in a particular vehicle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of determining the presence of a mobile computing device in a vehicle, comprising:
    positioning the mobile computing device in a vehicle;
    collecting at least one identifying factor through electronic data communications which at least partially identifies the vehicle, wherein the at least one identifying factor includes location service information from the mobile computing device;
    using an electronic processor, executing at least one rule to make a vehicle determination which identifies the vehicle based on the at least one identifying factor, wherein, during the step of making the vehicle identification, the electronic processor refers to stored vehicle profiles, each vehicle profile comprising a set of identifying factors which represents a specific vehicle, and selects an appropriate one of the vehicle profiles most closely matching the collected at least one identifying factor and wherein the electronic processor makes the vehicle determination based at least partially on detecting that the vehicle is traveling over a frequently used route for a specific user; and
    storing the result of the vehicle determination.

2. The method of claim 1 wherein the electronic processor makes the vehicle determination by identifying a one-to-one correspondence of a single identifying factor with a specific vehicle.

3. The method of claim 1 wherein the electronic processor makes the vehicle determination based on multiple identifying factors, wherein each of the multiple identifying factors considered individually implies but does not uniquely identify a specific vehicle.

4. The method of claim 1 wherein the at least one identifying factor includes records of wireless signal changes or patterns previously encountered by the mobile computing device.

5. The method of claim 1 wherein the vehicle profile is created by the steps of:

using the electronic processor, accepting a manual vehicle determination from a user;

collecting the at least one identifying factor; and storing the collected at least one identifying factor as the vehicle profile.

6. The method of claim 1 wherein the vehicle profile is created by the steps of:

collecting the at least one identifying factor;

flagging the at least one identifying factor as belonging to a specific vehicle based on a probabilistic determination; and storing the collected at least one identifying factor as the vehicle profile.

7. The method of claim 6 further comprising presenting the vehicle profile to a user for manual confirmation.

8. The method of claim 1 further comprising communicating directly or indirectly the result of the vehicle determination from the mobile computing device to a backend application over a wide area network.

9. The method of claim 1 wherein the electronic processor is contained in the mobile computing device.

10. The method of claim 1 wherein the electronic data communications occur between the mobile computing device and at least one other electronic device contained in the vehicle.

11. The method of claim 1 wherein the at least one other electronic device identifies at least one of the manufacturer or model of the vehicle, but does not provide a vehicle serial number or other unique identification.

12. The method of claim 11 wherein the at least one other electronic device includes at least one of a vehicle infotainment system or a vehicle charging interface.

13. The method of claim 10 wherein the other electronic device provides a unique identifier.

14. The method of claim 10 wherein the at least one other electronic device is operable to broadcast at least one of unique media access control address or a unique service set identifier.

15. The method of claim 1 wherein the at least one identifying factor is collected upon a discrete event.

16. The method of claim 1 wherein the at least one identifying factor is collected continuously.

17. The method of claim 1 wherein the vehicle determination has a variable level of confidence in the accuracy of the vehicle identification.

18. A method of determining the presence of a mobile computing device in a vehicle, comprising:

positioning the mobile computing device in a vehicle;

collecting at least one identifying factor through electronic data communications which at least partially identifies the vehicle, wherein the at least one identifying factor includes location service information from the mobile computing device, and wherein the electronic data communications occur between the mobile computing device and at least one other electronic device contained in the vehicle;

using an electronic processor, executing at least one rule to make a vehicle determination which identifies the vehicle based on the at least one identifying factor, wherein, during the step of making the vehicle identification, the electronic processor refers to stored vehicle profiles, each vehicle profile comprising a set of identifying factors which represents a specific vehicle, and selects an appropriate one of the vehicle profiles most closely matching the collected at least one identifying factor and wherein the electronic processor makes the vehicle determination based at least partially on detecting that the vehicle is traveling over a frequently used route for a specific user; and storing the result of the vehicle determination.

* * * * *